United States Patent [19]
Gautam et al.

[11] Patent Number: 5,956,704
[45] Date of Patent: Sep. 21, 1999

[54] METHOD AND APPARATUS FOR PARALLELIZING OPERATIONS THAT INSERT DATA INTO AN EXISTING DATA CONTAINER

[75] Inventors: Jyotin Gautam, Fremont; William H. Waddington, Foster City; Leng Leng Tan, Sunnyvale; Gary Hallmark, San Carlos; Jonathan Klein, Pleasanton; Allen Brumm, Foster City, all of Calif.

[73] Assignee: Oracle Corporation, Redwood Shores, Calif.

[21] Appl. No.: 08/870,147

[22] Filed: Jun. 5, 1997

[51] Int. Cl.⁶ .................................................. G06F 17/30
[52] U.S. Cl. ................................... 707/1; 707/8; 707/100
[58] Field of Search .................................. 707/8, 9, 200, 707/201, 203, 1, 10, 100

[56] References Cited

U.S. PATENT DOCUMENTS

| | | | |
|---|---|---|---|
| 5,434,994 | 7/1995 | Shaheen et al. ........................ 395/500 |
| 5,581,754 | 12/1996 | Terry et al. ............................. 395/608 |
| 5,590,326 | 12/1996 | Manabe .................................... 395/477 |
| 5,603,026 | 2/1997 | Demers et al. ......................... 395/608 |
| 5,737,600 | 4/1998 | Geiner et al. .......................... 395/616 |
| 5,758,149 | 5/1998 | Bierma et al. ......................... 395/608 |
| 5,761,658 | 6/1998 | Nishikawa et al. ........................ 707/8 |
| 5,790,848 | 8/1998 | Wlaschin ................................. 395/617 |
| 5,870,743 | 2/1999 | Cohen et al. ............................... 707/8 |

*Primary Examiner*—Paul V. Kulik
*Assistant Examiner*—Michael J. Wallace, Jr.
*Attorney, Agent, or Firm*—McDermott, Will & Emery

[57] ABSTRACT

A method and apparatus for parallelizing operations that change a database is provided. A coordinator process receives a statement that requires data to be written into the database. In response to the statement, the coordinator process assigns granules of work to multiple processes. Each of the multiple processes executes the granule of work by writing to the database a distinct portion of the set of data that is to be added to the database. The various portions of data are then merged to update the set of data to be added to the database.

27 Claims, 10 Drawing Sheets

METHOD AND APPARATUS FOR PARALLELIZING OPERATIONS THAT INSERT DATA INTO AN EXISTING DATA CONTAINER

RELATED APPLICATIONS

This application is related to U.S. Pat. No. 5,870,743 entitled "Method and Apparatus for Parallelizing Operations that Create a Table", which is assigned to the assignee of the present invention.

FIELD OF THE INVENTION

The present invention relates to parallelizing operations on a database, and more specifically, to parallelizing operations that insert data into an existing data container within a database.

BACKGROUND OF THE INVENTION

In typical database systems, users write, update and retrieve information by submitting commands to a database application. To be correctly processed, the commands must comply with the database language that is supported by the database application. One popular database language is known as Structured Query Language (SQL).

Multi-processing systems are typically partitioned into nodes, where each node may contain multiple processors executing multiple concurrent processes. To fully utilize the computing power of a multi-processing system, a database application may divide a large processing task required by a query into smaller work granules which may then be distributed to processes running on one or more processing nodes. Because the various work granules are being performed in parallel, the processing required by the query can be completed much faster than if the processing were performed on a single node by a single process. One mechanism for implementing parallel operations in a database management system is described in U.S. patent application No. 08/441,527 entitled "Method and Apparatus for Implementing Parallel Operations in a Database Management System" filed on May 15, 1995, by Gary Hallmark and Daniel Leary, incorporated herein by reference.

Unfortunately, the performance benefit gained by parallelizing a database operation is significantly diminished when the operation is divided into work granules that involve writing to the same data container. For example, consider the operation illustrated in FIG. 1, where a coordinator process 102 receives a query 104 that requires a block of data (DATA A-Z) to be generated and then inserted into a table 120 in a database 122.

Figure 1:
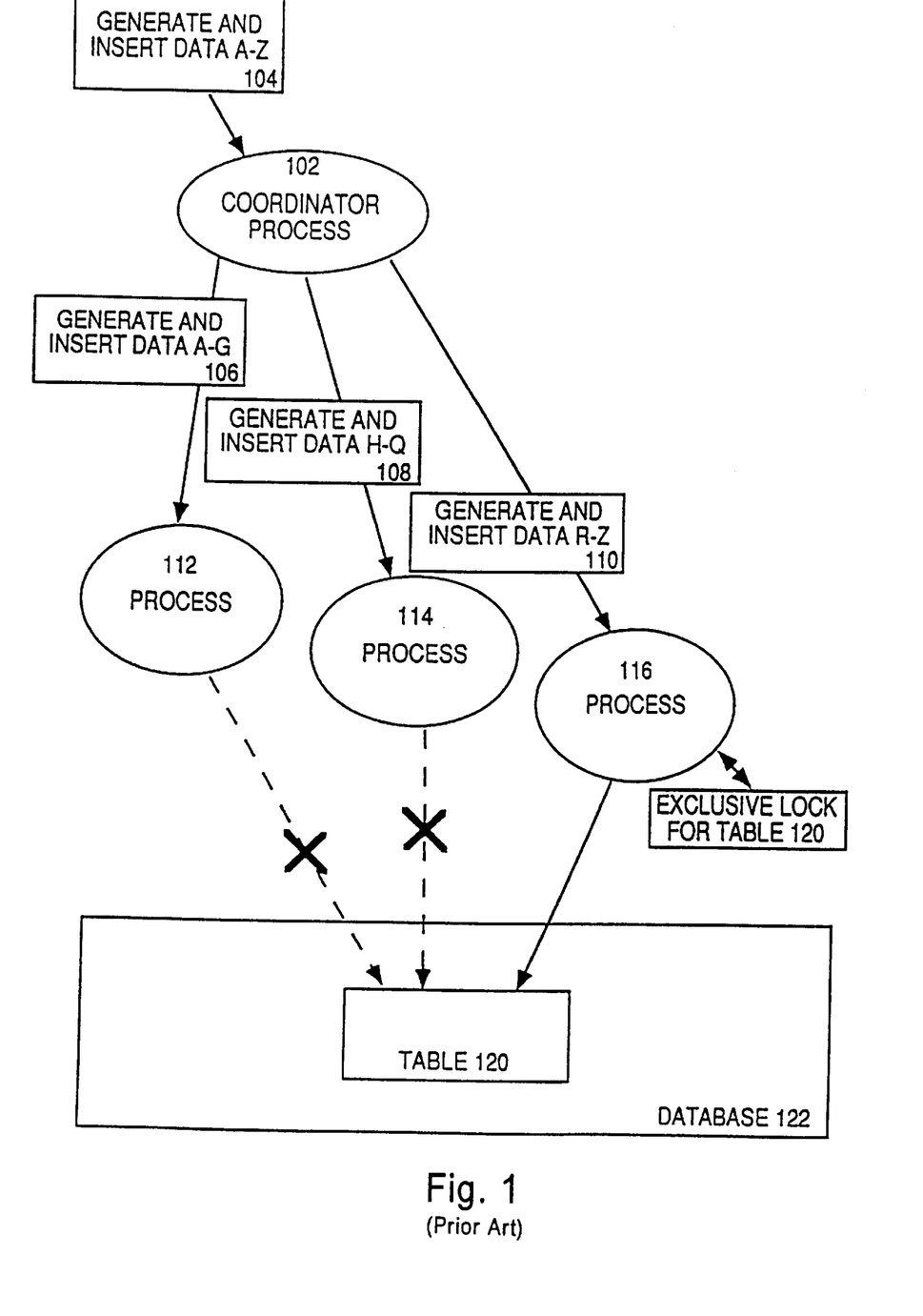
FIG. 1 illustrates a database system in which multiple processes are attempting to write to the same table.

The coordinator process 102 divides the query into work granules 106, 108 and 110, where each work granule calls for the generation and insertion of a subset of the set of data. In the illustrated example, work granules 106, 108 and 110 represent generate and insert operations for subsets A-G, H-Q and R-Z of data A-Z, respectively. The coordinator process 102 then distributes the work granules 106, 108 and 110 to processes 112, 114 and 116, respectively. Preferably, processes 112, 114 and 116 are executing on separate processors to allow maximum concurrency.

In the system illustrated in FIG. 1, access to the data container into which data is to be inserted (table 120) is governed by a lock. Because the work granules involve writing data into table 120, the exclusive lock on table 120 is obtained before they perform their assigned work granules. In the illustrated example, the exclusive lock for table 120 has been granted to process 116. Consequently, process 116 can proceed to perform work granule 110 by inserting subset of data R-Z into table 120. However, an exclusive lock can be held by only one process at a time. Therefore, processes 112 and 114 must wait for process 116 to release the exclusive lock for table 120. When process 116 completes the performance of work granule 110, process 116 will release the exclusive lock for table 120. At this time, the exclusive lock may be granted to one of the other processes 112 and 114 waiting to write to table 120.

Even when access to the data container into which data is to be inserted is not governed by a single lock, parallel insertion operations may be inefficient. For example, even when insertion into a table does not require an exclusive lock on the entire table, each process assigned to insert data must search for empty space within the table into which it may insert its data. As a process searches for empty space within a table, it is competing with all of the other processes that are searching for empty space within the same table. The more processes searching for insertion space within the same table at the same time, the greater the overhead involved in each of the parallel insertion operations.

The speed at which data can be inserted into an existing data container is also reduced by the overhead associated with generating redo and undo log information for the insertions. For example, an undo log record and a redo log record are typically generated for every row that is updated. The redo log record indicates how to reapply the change in case of a failure. The undo log record indicates how to remove the change. While this log information is used to return the database to a consistent state after a failure, generation and storage of the log information slows down any insertion process.

SUMMARY OF THE INVENTION

A method and apparatus for parallelizing operations that insert data into an existing data container in a database is provided. According to one aspect of the invention, a first write process writes a first subset of the set of data to a first, newly allocated segment that is external to the data container. A second write process writes a second subset of the set of data to a second segment that is external to the data container in parallel with the first write process writing the first subset to the first segment. The first segment and the second segment are then merged into the preexisting data container. Because the first and second processes are writing to separate segments that are external to the data container, they do not have to compete for an exclusive lock on the container.

According to an aspect of the invention, the first segment and the second segment are marked as temporary segments while the first write process and the second write process are writing to the first segment and the second segment. The first write process writes the first subset to the first segment without generating an undo log record and the second write process writes the second subset to the first segment without generating an undo log record. According to one embodiment, the generation of redo log information is controlled by a table-specific flag. Because the data is written into temporary segments, the data will not have to be expressly removed from the database in the case of a failure. According to some embodiments, neither undo nor redo log records are generated. Also, in some embodiments, segments into which data are inserted are pre-merged together, and the resulting merged set of segments is thereafter merged into the data container.

According to another aspect of the invention, a method for inserting data into a partitioned data container is provided. According to the method, a first process writes a first subset of the data into a first partition of the partitioned data container. The first partition comprises a region of allocated space that includes a used portion and an unused portion. A first data value ("high water mark") is maintained for each partition to indicate a boundary between the used portion and the unused portion. The first process writes the first subset of data into the unused portion of the space allocated to the first partition.

A second process writes a second subset of the data into a second partition of the partitioned data container in parallel with the first process writing the first subset of data into the first partition. The second partition also comprises a region of allocated space that includes a used portion and an unused portion. A second data value is maintained to indicate a boundary between the used portion and the unused portion. The second process writes the second subset of data into the unused portion of the space allocated to the second partition.

When the first and second processes have finished, the first subset and the second subset are merged into the data container by updating the first data value and the second data value to include the first subset and second subset in the used portions of the allocated space.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for parallelizing a database operation that involves inserting data into an existing data container in a database are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 2:
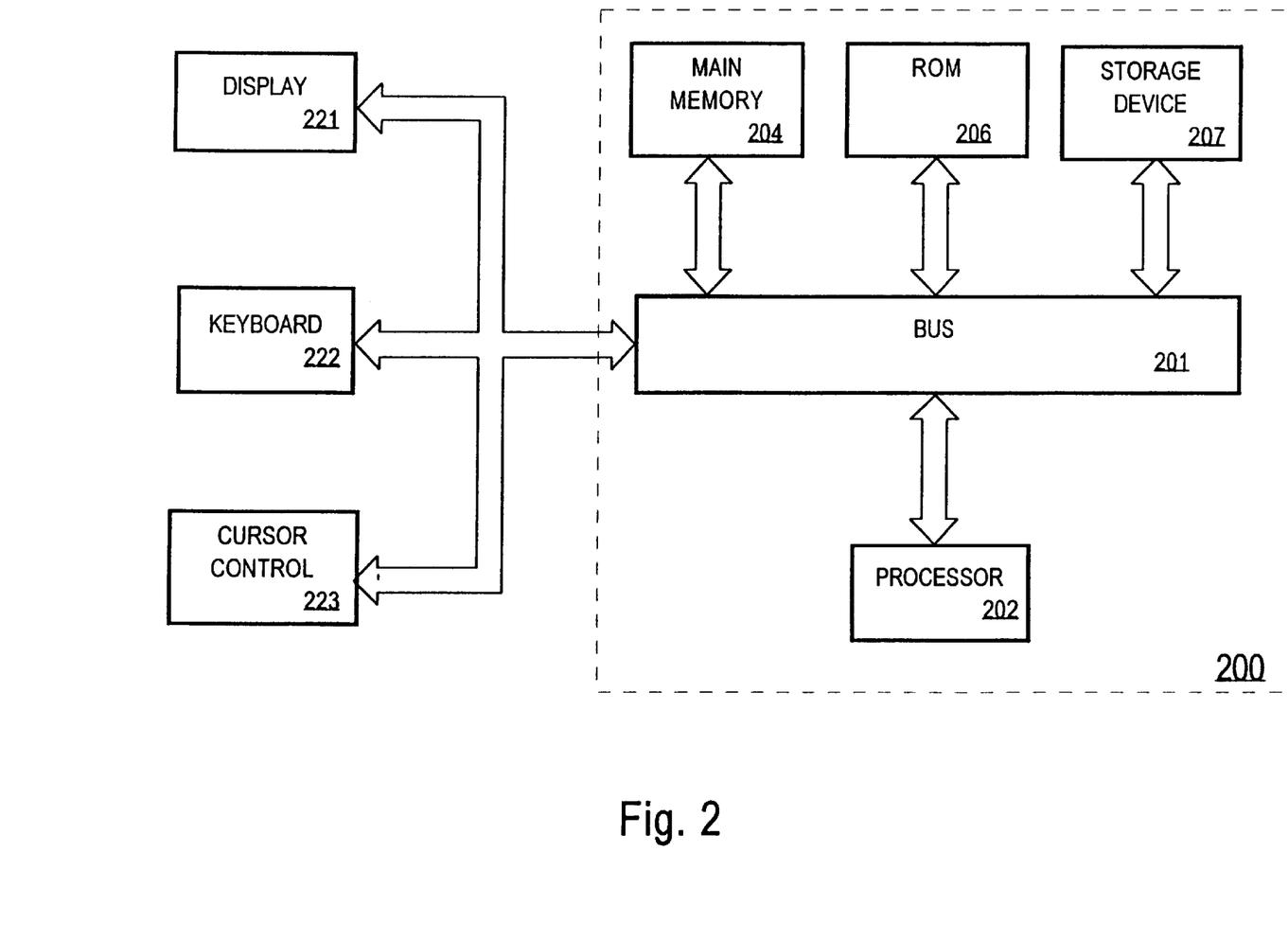
FIG. 2 illustrates a computer system which may be used to implement the present invention.

Referring to FIG. 2, the computer system 200 upon which an embodiment of the present invention can be implemented. Computer system 200 comprises a bus 201 or other communication means for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

The present invention is related to the use of computer system 200 to parallelize database operations that write data into an existing container within the database. According to one embodiment, write operations are parallelized by computer system 200 in response to processor 202 executing sequences of instructions contained in memory 204. Execution of the sequences of instructions contained in memory 204 causes processor 202 to divide write operations into multiple work granules which are executed as will be described hereafter. In alternative embodiments, hard-wired circuitry may be used in place of or in combination with software instructions to implement the present invention. Thus, the present invention is not limited to any specific combination of hardware circuitry and software.

FUNCTIONAL DESCRIPTION

As explained above, database operations that write a set of data into an existing container that is protected by a lock are typically performed by only one process at a time, because only one process can hold the exclusive lock that grants the exclusive right to access the data container. Even when the data container is not protected by a single lock, parallel insert operations are inefficient when the insertion processes must search to find empty space in the existing data container. It should be noted that the data container into which data is to be inserted may exist at any level of granularity. For example, the data container at issue may be a table, a partition, a segment, a data block or a row. The present invention is not limited to any particular type or granularity of data container.

Database statements that require write operations typically include processing steps that precede the actual step of storing data into the database. Specifically, preliminary steps of creating, re-arranging, or collecting the data ("data generation" steps) may have to be performed before the data is written to the data container. According to an embodiment of the invention, a coordinator process divides operations that include writing data into a data container into multiple sets of work granules, where each set of work granules is composed of work granules that can be performed in parallel with respect to each other. The coordinator process may assign the work granules to multiple processes so that the work granules may be executed in parallel to take advantage of the processing power of a multi-processing system.

According to one embodiment of the invention, one or more sets of work granules are created for performing the preliminary steps of data generation. The data generated during the execution of the work granules associated with the data generation steps are stored in a table queue that is maintained separate from the data container itself. A table queue is a communication abstraction that encapsulates the data flow and partitioning functions. A table queue partitions its input to its output according to the needs of a consumer.

The coordinator process creates a set of work granules for loading data from a table queue into a specified pre-existing data container. The "loading" work granules are assigned to a set of processes. Each process assigned a loading work granule reads data from the table queue and writes the data to a distinct segment within the database, a segment being a unit of database table storage. The distinct segments to which the loading processes write their data do not currently belong to the data container into which the data is to be loaded. Because each process is performing the data loading portion of the write operation for a distinct segment, the processes do not have to compete for control of an exclusive lock with other processes working on other portions of the same operation.

According to one embodiment, work that cannot be parallelized is performed by the coordinator process itself. Thus, after a set of processes load segments with the data to be inserted into a table, the coordinator process performs the final merging of the segments into the table. The process of merging segments into a table shall be described in greater detail hereafter. The coordinator process may also assign itself work granules from other sets of work granules. The present invention is not limited to any particular distribution technique of work between the coordinator process and other processes.

Figure 3A:
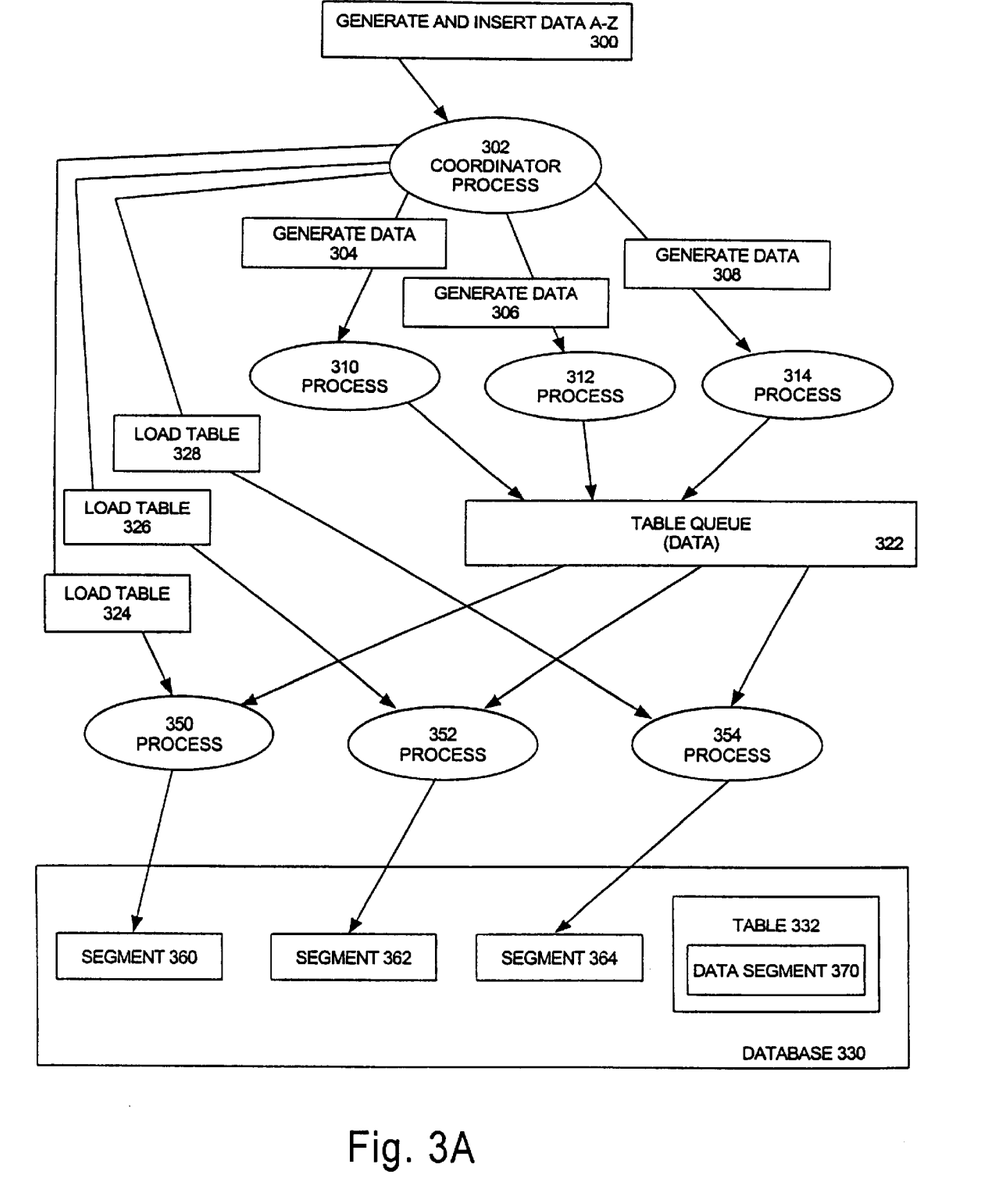
FIG. 3A illustrates a computer system in which parallel processes are used to write data into segments that are external to a table according to one embodiment of the invention.

FIG. 3a is a block diagram illustrating how, according to an embodiment of the invention, a write operation is divided into work granules, and how the work granules are distributed. In the illustrated example, the initial statement 300 involves the creation of a set of data (DATA A-Z) and the insertion of the data into an existing table 332. The current contents of table 332 are stored in a data segment 370. A coordinator process 302 receives statement 300 and obtains an exclusive lock on the table 332. The coordinator process 302 then divides the query up into two sets of work granules. The first set of work granules includes work granules 304, 306 and 308, which are assigned to processes 310, 312 and 314, respectively. The second set of work granules consists of work granules 324, 326 and 328, which are assigned to processes 350, 352 and 354, respectively.

Each of work granules 304, 306 and 308 requires the generation of a fraction of the data A-Z that will ultimately be inserted into table 332. However, the work granules 304, 306 and 308 do not include a step of inserting the data into table 332. Rather, each work granule 304, 306 and 308 specifies that the data generated during the performance of the work granule is to be sent to a common table queue 322. Because work granules 304, 306 and 308 do not involve writing data into the database 330, they may be executed simultaneously.

During the performance of the first set of work granules, table queue 322 will receive all of the data A-Z to be written to table 332. Coordinator process 302 then assigns the "load table" work granules 324, 326 and 328 to processes 350, 352 and 354. Specifically, each of processes 350, 352 and 354 is assigned to load data from the table queue 322 into distinct segments of the database 330. Before loading data into the database, processes 350, 352 and 354 obtain exclusive locks for the portion of the database to which they are writing. However, since the processes 350, 352 and 354 are writing to distinct segments, they do not have to compete with each other for locks on the segments to which they are writing. Therefore, the data A-Z may be loaded into the database 330 more efficiently by processes 350, 352 and 354 than by processes 112, 114 and 116 of FIG. 1, where many processes must compete for an exclusive lock on the data container.

Figure 3B:
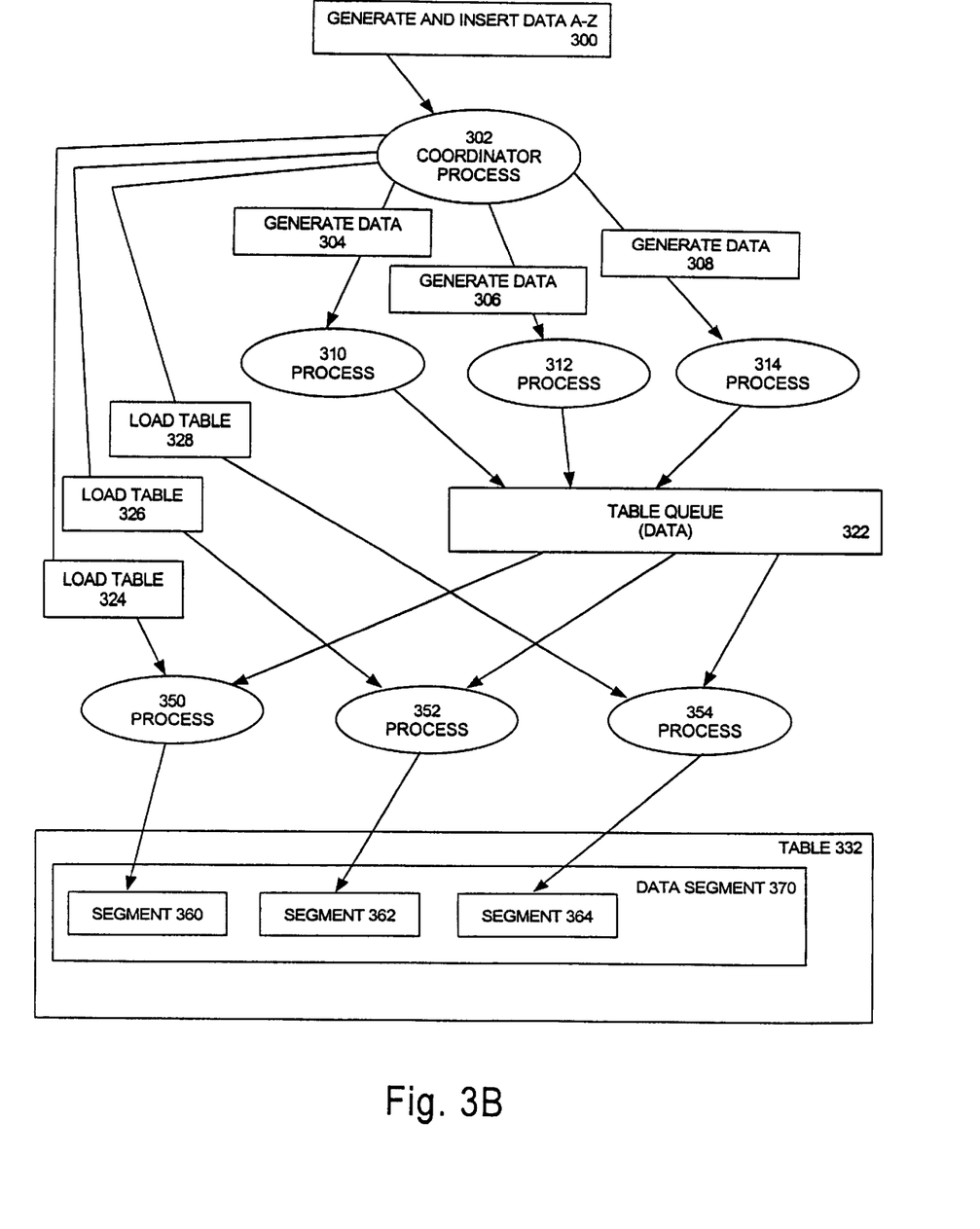
FIG. 3B illustrates the computer system of FIG. 3A in which the segments are merged into the table.

In the example illustrated in FIG. 3, processes 350, 352 and 354 write data to segments 360, 362 and 364, respectively. After processes 350, 352 and 354 have completed their respective load operations, the coordinator process 302 merges the loaded segments 360, 362 and 364 into the table 332, and makes the segments permanent in the database. The processes 350, 352 and 354 then release the locks they have on the individual segments. FIG. 3b illustrates Table 332 after the segments 360, 362, and 364 have been merged with data segment 370.

NO-LOGGING

A database is in a transaction consistent state when the database reflects (1) all of the changes made by a particular set of transactions that have completed successfully, and (2) no partial changes made by any other transactions. Thus, for any given transaction, the database must reflect all changes made by the transaction or no changes made by the transaction. Consequently, while a transaction is writing to the database, the transaction also generates and stores undo log records that can be used to undo the changes in case the transaction is unable to complete successfully. For example, if a transaction that makes changes to the database cannot be completed due to deadlock, the transaction must be "rolled back". When a transaction is rolled back, the changes made by the transaction are removed from the database using the undo log records generated during the performance of the changes.

Typically, when a transaction makes a change to data in the database, the transaction generates an undo log record and a redo log record of the change. These log records are stored on a non-volatile storage device. If a crash occurs, the log records are used to recover the database to a transaction consistent state.

Specifically, the undo log record is used for removing a change made by the transaction if the transaction does not complete successfully prior to a crash, as described above.

The redo record is used to record the change. If the transaction successfully completes but the database crashes before the modified data is written to disk, the modified data will be lost. Under these circumstances, the redo log is used to update the database to reflect the changes made by the transaction.

According to one embodiment of the invention, a transaction performing a parallel insert operation avoids the overhead inherent in log generation by causing changes to the table to be written without generating and storing conventional undo and/or redo log records. Because all temporary segments written to during a parallel insert operation are merged into the table in an atomic operation, the table will either reflect all changes made in the insert transaction, or it will not reflect any of the changes. In either situation, the database will be in a transaction consistent state, so the generation of conventional undo and redo log records is not necessary for recovery.

Instead of generating a conventional redo log record for each block that is written to during the parallel insert operation, one or more invalidation records are generated. Unlike a conventional redo record, an invalidation record does not identify a specific change to a specific data block. Rather, an invalidation record simply indicates that a particular range of blocks are to be marked as invalid or "corrupted". Consequently, the invalidation records are significantly smaller than conventional redo records, and involve significantly less overhead to generate and store. During the recovery of a database, a recovery process may apply the invalidation records by marking the range of blocks associated with an invalidation record as "corrupted". This effectively removes the data that had been inserted into those blocks by the parallel insert operation before the failure.

DIRECT WRITE

In some database systems, transactions that write to the database store changes to the database in a buffer cache located in dynamic memory. The buffer cache is shared among all of the transactions that access the database. Data in the buffer cache is written back to disk as required to free up space for new data. According to one embodiment of the invention, a transaction performing a parallel insert operation avoids the overhead inherent in the buffer cache by causing changes to the table to be written directly to disk without using the buffer cache. As mentioned above, the table will either reflect all changes made in the insert transaction, or it will not reflect any of the changes. In either situation, the database will be in a transaction consistent state.

PARALLEL INSERT EXAMPLE

The execution of a parallel insert operation has been generally described above. For the purposes of example, FIGS. 4–6 shall be used to describe the specific steps of a parallel insert operation that uses the query parallelization techniques described in U.S. patent application No. 80/441,527, entitled "Method and Apparatus for Implementing Parallel Operations in a Database Management System", the contents of which are incorporated herein by reference. However, the present invention is not limited to any particular techniques for parallelizing execution of database operations.

Figure 4:
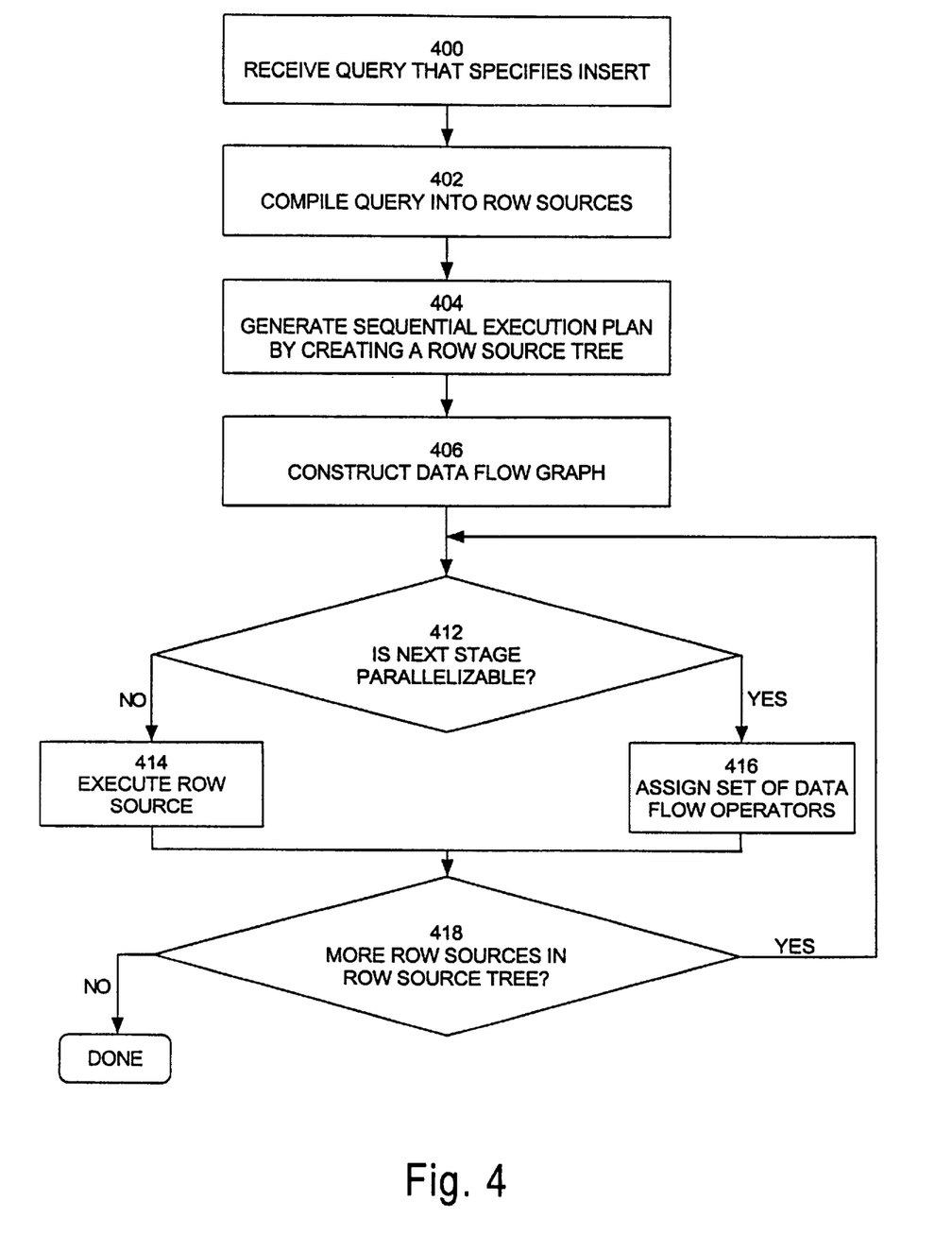
FIG. 4 is a flow chart illustrating the steps to perform a parallel insert operation according to an embodiment of the invention.

Referring to FIG. 4, the database receives a query that includes an insert statement at step 400. At step 402, the query is compiled. During the compilation process, the query is decomposed into its constituent parts. The smallest constituent parts of the query are referred to as "row sources". Each row source corresponds to an operation that produces rows.

At step 404, a sequential plan of query execution is generated. The plan may take the form of a row source tree, where the row sources identified in step 402 are connected to form a tree-like structure. In the present example, the row source tree 500 illustrated in FIG. 5 may be generated as the query execution plan. Row source tree 500 includes a Table Scan row source 502 feeding a Load Table row source 506.

Figure 5:
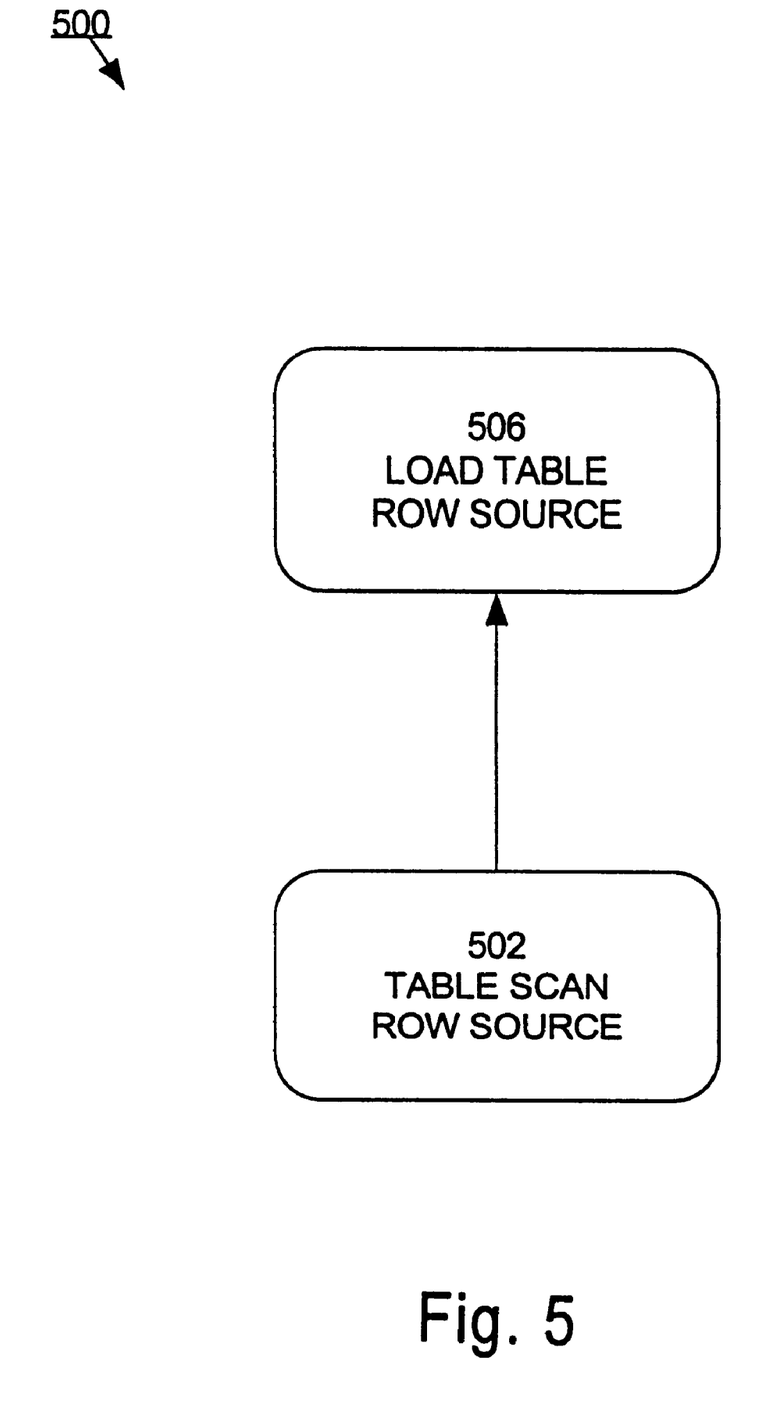
FIG. 5 illustrates a row source tree that may be generated in response to a parallel insert operation according to an embodiment of the invention.

Table Scan row source 502 is an operation for reading all of the rows of table t1 and making copies of the rows in dynamic memory. Load Table row source 506 is an operation for loading segments of a table into a database. Once loaded, the segments may be merged into the table.

More specifically, the Load Table row source 506 allocates a unit of database table storage (a "table segment") which is marked "temporary". The Load Table row source 506 then fills the table segment with rows retrieved from a table queue. The table segment is extended as necessary to accommodate as many rows as are required (or until storage resources associated with the database are exhausted).

The table segment is marked "temporary" so that if any part of the operation fails, the storage associated with the segment can later be reclaimed by other database operations. A table persistently stored in the database can be composed of many such segments.

Once the Load Table row source 506 finishes writing the table segment, the Load Table row source 506 returns to the caller of the entire row source tree an "address" or "handle" of the segment and the number of rows in the segment. According to one embodiment, this caller is not itself another row source, but a top level component of the database system which is responsible for driving the overall insert operation. When the row source is transformed into a DFO tree and executed in parallel, as shall be described hereafter, this caller is implemented in the coordinator process.

Figure 6:
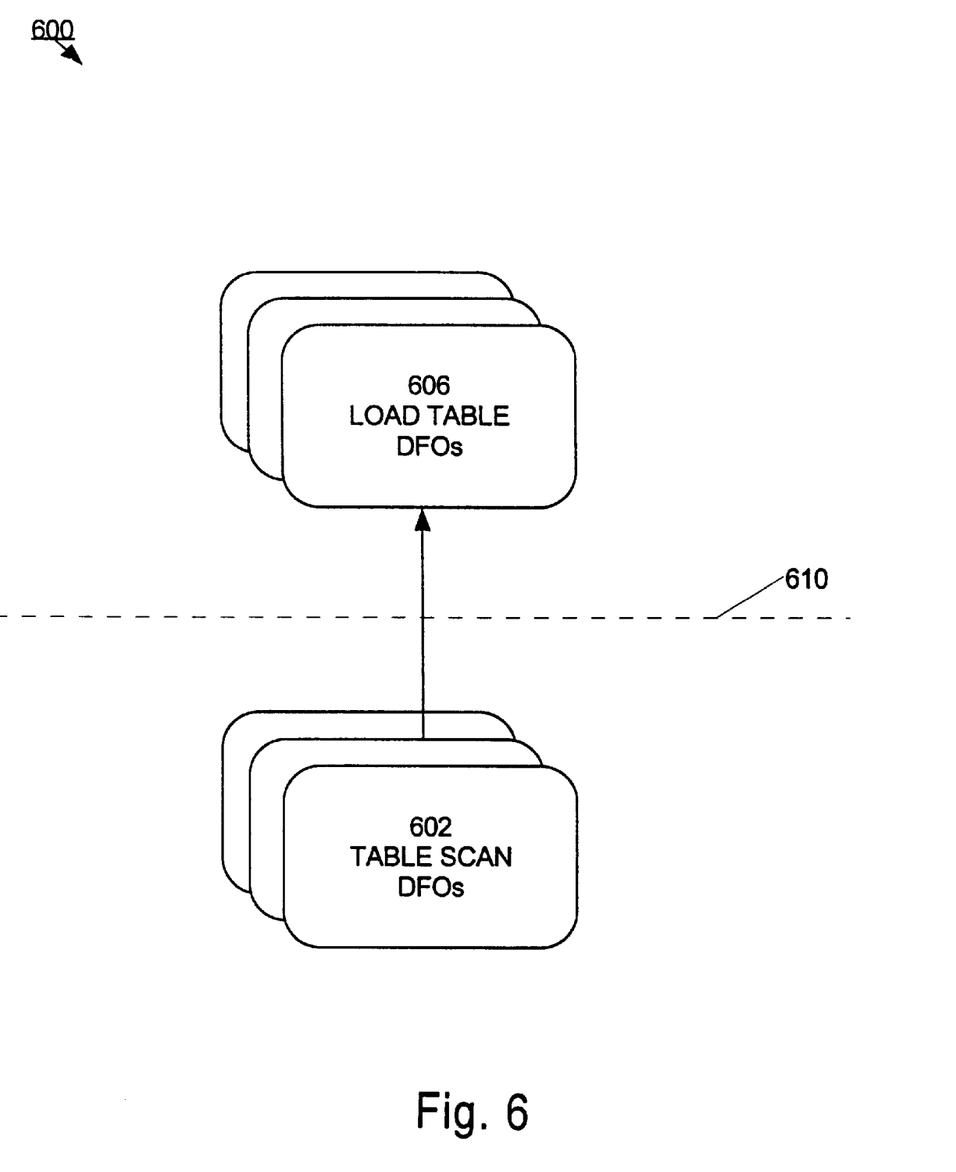
FIG. 6 illustrates a data flow operator tree that may be generated based on the row source tree of FIG. 5, according to an embodiment of the invention.

After the sequential query execution plan is generated, a data flow graph is constructed (step 406) from the row source tree using a parallelizing mechanism such as that described in U.S. patent application No. 08/441,527 entitled "Method and Apparatus for Inplementing Parallel Operations in a Database Management System" filed on May 15, 1995, by Gary Hallmark and Daniel Leary. FIG. 6 illustrates a Data Flow Operator ("DFO") tree that may be generated based on the row source tree of FIG. 5 according to an embodiment of the invention.

The DFO tree 600 of FIG. 6 includes Table Scan DFOs 602 and Load Table DFOs 606. Table Scan DFOs 602 and Load Table DFOs 606 correspond to Table Scan row source 502 and Load Table row source 506, respectively. The Load Table DFOs 606 are comprised of the Load Table row source 506, together with the additional information required by any DFO (e.g., partitioning requirements, parallelizability) and as described in the incorporated U.S. patent application No. 08/441,527 entitled "Method and Apparatus for Implementing Parallel Operations in a Database Management System" filed on May 15, 1995, by Gary Hallmark and Daniel Leary.

Based on the DFO tree 600, the insert operation has been divided into two stages. Data produced at the first stage flows to the second stage.

After a DFO tree has been constructed, a coordinator process causes the query to be executed based on the row source tree and the DFO tree. At step 412, the coordinator process determines whether the current stage of the execution process is parallelizable. If the current stage is not parallelizable, then at step 414 the coordinator process executes the row source associated with the current stage. If the current stage is parallelizable, the coordinator process assigns the DFOs to a set of processes at step 416. Each process that has been assigned a DFO generates a row source based on the DFO and executes the row source. This process is repeated until all stages of the query have been executed.

In the present example, the coordinator process assigns the Table Scan DFOs 602 to a set of processes for execution during the first stage of the query execution process. Each process assigned one of Table Scan DFOs 602 performs a table scan operation. The output of processes that execute the Table Scan DFOs 602 are used as input for the processes that participate in the next stage of the query execution process.

A table queue encapsulates the data flow and partitioning functions between the processes executing one DFO ("producer processes") and the processes executing the following DFO ("consumer processes"). The input function of a table queue is determined by the partitioning type used by the producer processes. A table queue partitions its input to its output according to the needs of the consumer processes.

For any given table queue, the relationship between producer processes and consumer processes may be one-to-many, many-to-one, or many-to-many. During the execution of the process represented by the DFO tree 600 of FIG. 6, one or more processes executing Table Scan DFOs 602 send data into a first table queue. One or more processes executing the Load Table DFOs 606 receive data from the first table queue as input data. The processes executing the Load Table DFOs 606 construct table segments from the data retrieved from the first table queue.

For the next stage of the insert operation, the coordinator process obtains a lock on the table into which data is to be inserted, and assigns the Load Table DFOs 606 to a set of processes for execution. The processes that execute the Load Table DFOs 606 use as input the output of the processes that execute the Table Scan DFOs 602. The processes that execute the Load Table DFOs 606 obtain locks on the segments into which they will insert data. Those segments will ultimately be combined with the existing data segment of the table to form the revised table. The locks obtained by the processes executing the Load Table DFOs 606 prevent other processes from using the segments for other purposes. The table lock held by the coordinator process does not prevent the processes that are executing the Load Table DEOs 606 from writing to their respective segments, since the segments are not yet part of the table.

If the user specified CHECK constraints (including the NOT NULL constraint) in the insert statement, then these constraints can be enforced by the load table row source and hence are enforced in parallel by the load table DFO. A check constraint declares that for each row of a table, some user-specified predicate which applies to the values of one or more columns of that row, must evaluate to true. In order to enforce this constraint, the load table row source applies the predicate to each row obtained from its input row source prior to inserting the row into its temporary segment. If the predicate fails, then an error is signaled to the user, the operations abort, and the transaction is rolled back.

Each process executing a Load Table DFO informs the coordinator process when it has written its last row to the segment. After all the Load Table DFOs 606 have completed, the coordinator process merges the segments into the preexisting table. The process of merging segments into a table is relatively computationally inexpensive to perform. The work required to merge the segments does not, in particular, grow as the size of the segment contents grows (but rather as the number of segments).

As part of the merge process, the coordinator process then changes the status of the segments from "temporary" to "permanent". The status of the segments can be changed from "temporary" to "permanent" status inexpensively and without requiring work on the order of the size of the segment contents. Once the segments have been made permanent, the processes that performed the Load Table DFOs 606 release their locks on the segments.

The parallel insertion techniques described above have been described in the context of inserting data into a non-partitioned table. However, the techniques apply to data containers at any level of granularity. For example, the parallel insert technique can be used on a partitioned table by treating each partition as its own table. Specifically, multiple load processes can create multiple temporary segments which can be inserted, in parallel, into the appropriate partitions of the partitioned table.

MERGING

Figure 9:
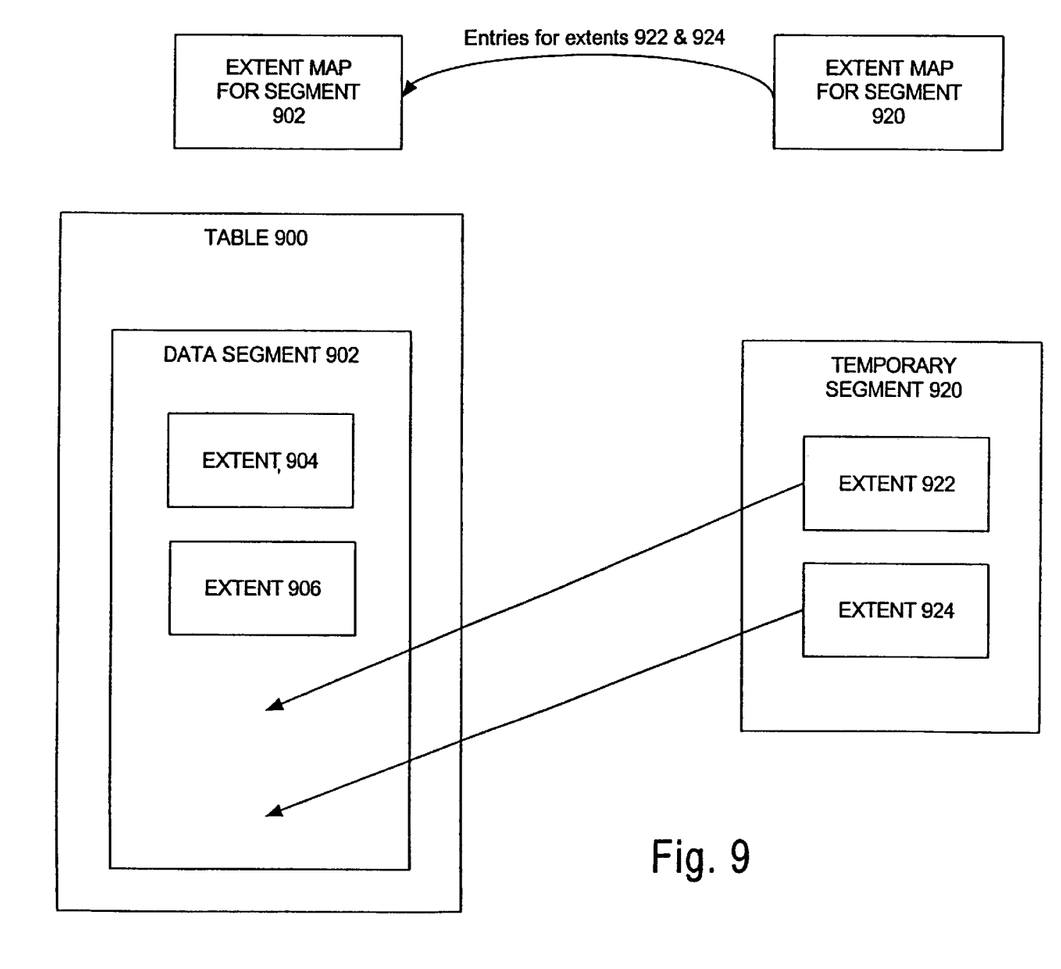
FIG. 9 illustrates a merge operation according to an embodiment of the present invention.

Referring now to FIG. 9, merging is discussed in greater detail. Merging temporary segments into a pre-existing table involves reassigning the extents within the temporary segments to data segments of the table. Reassigning an extent may be performed by removing the information about the extent, including the starting location, length, and high water mark, from the extent map for the temporary segment and adding it to the extent map associated with a data segment of the table. The extent thus becomes part of the data segment owning the extent map. For example, temporary segment 920 may be merged into a table 900 by writing the starting location, length, and high water mark of extents 922 and 924 to the extent map for data segment 902 and removing the information from the extent map for segment 920. Segment 920 then ceases to exist, as the extents it contained are subsumed into the preexisting data segment 902.

According to one embodiment of the invention, the temporary segments are pre-merged before being merged into the table. Thus, if eight processes write to eight segments, the eight segments can be merged into a single segment and the single segment can then be merged into the table.

Concurrency within the merging operation may be increased by merging temporary segments in parallel. For example, segment 1 merges with segment 2, segment 3 merges with segment 4, segment 5 merges with segment 6, segment 7 merges with segment 8. The resulting four segments may then be merged in parallel to create two segments. The two segments may then be merged together, and then merged into the table.

PARTITIONED TABLES

In a partitioned table, each partition has its own data segment that includes one or more series of contiguous data blocks ("extents"). The data segment of each partition may include an extent that contains some unused storage. A "high-water mark," or pointer, associated with each partially filled extent indicates the boundary between the used an unused portions within the extent.

Figure 7:
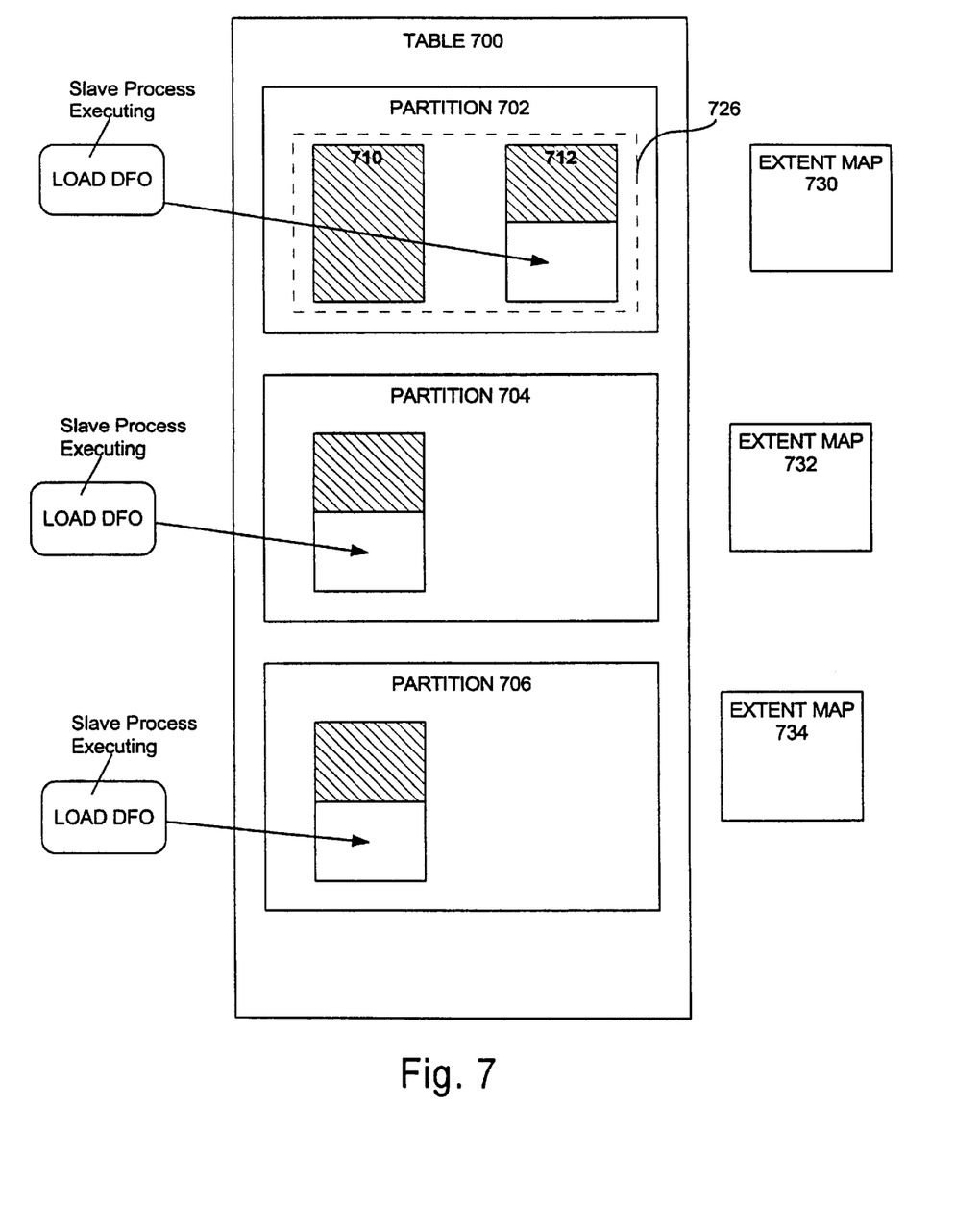
FIG. 7 illustrates a partitioned table into which multiple processes are concurrently inserting data according to an embodiment of the present invention.
Figure 8:
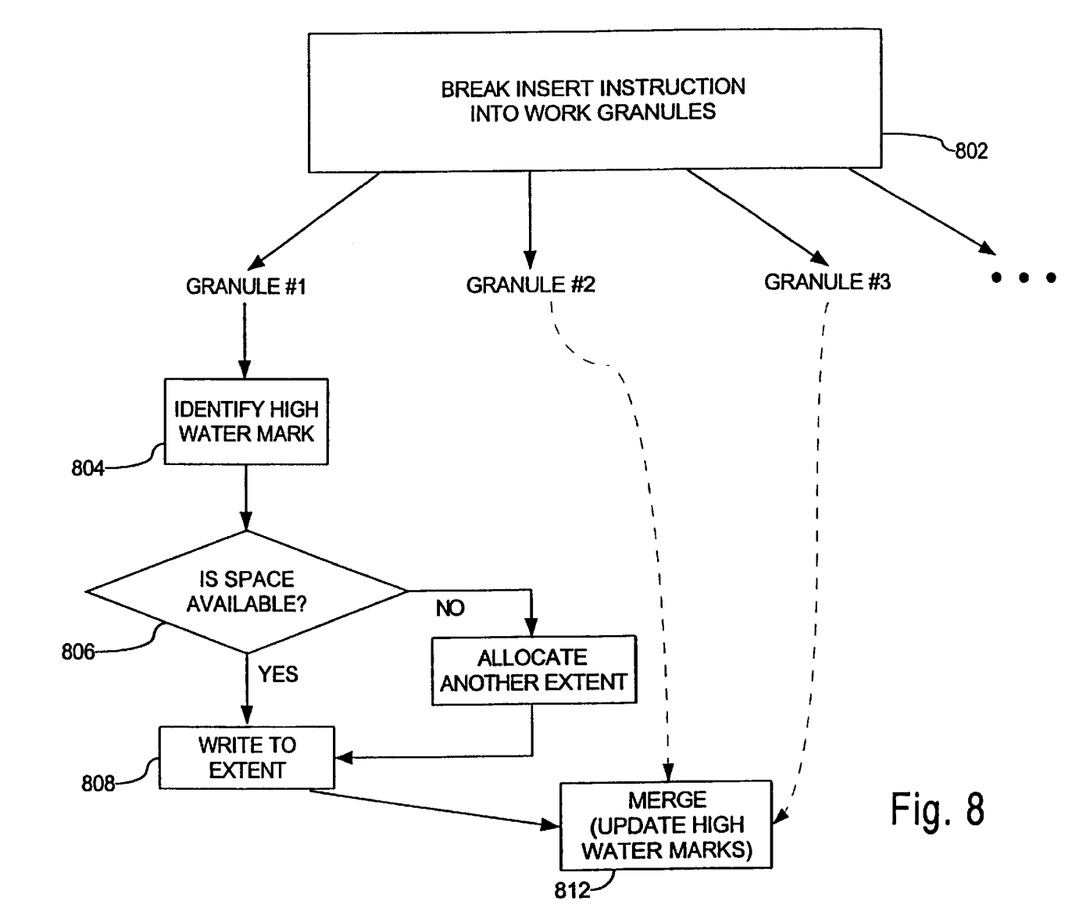
FIG. 8 illustrates a method for performing a parallel insert according to one embodiment of the present invention.

FIG. 7 shows one such partitioned table 700, and FIG. 8 shows a method for performing parallel inserts into the partitioned table 700 according to one embodiment of the present invention. The table 700 shown has three partitions 702, 704 and 706. Each partition contains data stored in a data segment. The data segment of partition 702 (segment 726) contains extents 710 and 712. Extent 710 is full; it cannot receive any additional data. However, extent 712 includes unused storage.

Extent maps 730, 732 and 734 are associated with partitions 702, 704 and 706 of table 700, respectively. Extent map 730 contains a list of all of the extents in segment 726. For each extent in segment 726, extent map 730 contains the starting address and length. For the extents that are not full, extent map 730 also contains a high water mark. Thus, the extent map 730 contains the starting address and length of extents 710 and 712, and also contains the high water mark for extent 712. Extent maps 732 and 734 contain similar information for the extents that belong to partitions 704 and 706.

According to one embodiment of the present invention, data for insertion into a partitioned table is inserted into the unused portion of each partition (i.e., beyond the high water mark). This insertion is accomplished at steps 802–812. At step 802, the insert instruction is broken into sub-steps or work granules. Each work granule has a subset of the data to be inserted, and is assigned to no more than one process per partition. Each slave process identifies an unsaturated extent within a distinct partition. Each slave process then, at step 804, identifies the high water mark for a partially fall segment within its corresponding partition. At step 806, the slave process determines whether sufficient space within the extent beyond the high water mark exists for the data to be written. If there is sufficient space, then at step 808 the data is written into extent. If there is not sufficient space, the slave process allocates another extent to its partition and writes to the new extent.

Data that has been inserted into the unused portion of a partition is "merged" into the data segment of the partition by simply updating the high water marks within the extent map associated with the partition to indicate that the used/unused data boundary is located on the other side of the newly inserted data. Thus, at step 812, the high water mark is changed, so that the newly inserted data is effectively merged into the table and will not be overwritten by a subsequent write or insert operation.

INDEXES

When data is inserted into existing data containers, indexes built on those data containers need to be updated to reflect the new data. To ensure the database remains in a consistent state, new indexes that reflect the data containers with the new data may be constructed in temporary segments. As part of merging the new data into the data containers, the old indexes may be invalidated and segments containing the new indexes may be converted from temporary to permanent.

Updates to the indexes associated with existing data containers may also be performed in a batch operation rather than on a row-by-row basis. Techniques for performing batch updates on indexes are described in U.S. patent application No. 08/855,544, entitled Batch Processing of Updates to Indexes, filed on Jun. 4, 1997, by Wei Huang, Gianfranco Putzolu and William H. Waddington, the contents of which are incorporated herein by this reference.

DATABASE ARCHITECTURE

Multi-processing computer systems typically fall into three categories: shared everything systems, shared disk systems, and shared nothing systems. The constraints placed on the coordinator process during the work granule distribution process vary based on the type of multi-processing system involved. The magnitude of the work performed by the coordinator process is not based on the size of the task to perform, but is proportional to the number of granules into which the task is divided.

In shared everything systems, processes on all processors have direct access to all dynamic memory devices ("memory") and to all persistent memory devices ("disks") in the system. Consequently, a coordinator process in a shared everything system has few constraints with respect to how work granules may be assigned.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node.

In shared nothing systems, all processors, memories and disks are grouped into nodes. In shared nothing systems as in shared disk systems, each node may itself constitute a shared everything system or a shared disk system. Only the processes running on a particular node can directly access the memories and disks within the particular node. Of the three general types of multi-processing systems, shared nothing systems typically require the least amount of wiring between the various system components. However, shared nothing systems are the most susceptible to unbalanced workload conditions. For example, all of the data to be accessed during a particular work granule may reside on the disks of a particular node. Consequently, only processes running within that node can be used to perform the work granule, even though processes on other nodes remain idle. This invention does not require the database system to be shared-nothing. Thus, the table that is updated as a result of the parallel insert operation may or may not be physically partitioned on distinct nodes or disks of the database system. Further, each individual segment populated by the processes executing the Load Table DFO does not need to be physically confined to a specific disk device, since it might be striped over multiple devices.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing a statement that requires insertion of data into a preexisting data container, the method comprising the steps of:

receiving the statement;

causing a first write process to write a first subset of the set of data to a first area that is external to the data container;

causing a second write process to write a second subset of the set of data to a second area that is external to the data container in parallel with the first write process writing the first subset to the first area; and merging the first area and the second area into the preexisting data container.

2. The method of claim 1 wherein:

the first area and the second area are marked as temporary areas while the first write process and the second write process are writing to the first area and the second area;

the first write process writes the first subset to the first area without generating an undo log record; and the second write process writes the second subset to the first area without generating an undo log record.

3. The method of claim 1 wherein:

the first write process writes the first subset directly to the first area without using a shared buffer cache; and the second write process writes the second subset directly to the second area without using the shared buffer cache.

4. The method of claim 1 wherein the step of merging includes the steps of:

pre-merging the first area and the second area together to create a third area; and merging the third area into the preexisting data container.

5. The method of claim 1 wherein:

a first extent map includes a first set of records that identify extents that belong to the data container;

a second extent map includes a second set of records that identify extents that belong to the first area;

a third extent map includes a third set of records that identify extents that belong to the second area; and the step of merging the first area and the second area into the preexisting data container includes the step of writing the second set of records into the first extent map and writing the third set of records into the first extent map.

6. The method of claim 1 wherein:

the method comprises the steps of generating a plurality of work granules based on the statement; and causing a coordinator process to assign the plurality of granules to a plurality of write processes including the first write process and the second write process.

7. The method of claim 6 wherein:

the plurality of processes send messages to the coordinator process when they have completed execution of the plurality of work granules;

when all of the plurality of work granules have been completed, the coordinator process executes the step of merging the first area and the second area into the preexisting data container.

8. A method for inserting data into a partitioned data container, the method comprising the steps of:

causing a first process to write a first subset of the data into a first partition of the partitioned data container;

wherein the first partition comprises a region of allocated space that includes a used portion and an unused portion;

wherein a first data value is maintained to indicate a boundary between the used portion and the unused portion;

wherein the first process writes the first subset of data into the unused portion;

causing a second process to write a second subset of the data into a second partition of the partitioned data container in parallel with the first process writing the first subset of data into the first partition;

wherein the second partition comprises a region of allocated space that includes a used portion and an unused portion;

wherein a second data value is maintained to indicate a boundary between the used portion and the unused portion;

wherein the second process writes the second subset of data into the unused portion; and merging the first subset and the second subset into the data container by updating the first data value and the second data value to include the first subset and second subset in the used portions.

9. The method of claim 8 wherein the first process writes the first subset without generating an undo log record and the second process writes the second subset without generating an undo log record.

10. A computer-readable medium having stored thereon sequences of instructions for processing a statement that requires insertion of data into a preexisting data container in a database, the sequences of instructions including sequences of instructions for performing the steps of:

receiving the statement;

causing a first write process to write a first subset of the set of data to a first area that is external to the data container;

causing a second write process to write a second subset of the set of data to a second area that is external to the data container in parallel with the first write process writing the first subset to the first area; and merging the first area and the second area into the preexisting data container.

11. The computer-readable medium of claim 10 wherein:

the first area and the second area are marked as temporary areas while the first write process and the second write process are writing to the first area and the second area;

the first write process writes the first subset to the first area without generating an undo log record; and the second write process writes the second subset to the first area without generating an undo log record.

12. The computer-readable medium of claim 10 wherein:

the first write process writes the first subset directly to the first area without using a shared buffer cache; and the second write process writes the second subset directly to the second area without using the shared buffer cache.

13. The computer-readable medium of claim 10 wherein the step of merging includes the steps of:

pre-merging the first area and the second area together to create a third area; and merging the third area into the preexisting data container.

14. The computer-readable medium of claim 10 wherein:

a first extent map includes a first set of records that identify extents that belong to the data container;

a second extent map includes a second set of records that identify extents that belong to the first area;

a third extent map includes a third set of records that identify extents that belong to the second area; and the step of merging the first area and the second area into the preexisting data container includes the step of writing the second set of records into the first extent map and writing the third set of records into the first extent map.

15. The computer-readable medium of claim 10 wherein:

the sequence of instructions further comprises sequences of instructions for performing the steps of generating a plurality of work granules based on the statement; and causing a coordinator process to assign the plurality of granules to a plurality of write processes including the first write process and the second write process.

16. The computer-readable of claim 15 wherein:

the plurality of processes send messages to the coordinator process when they have completed execution of the plurality of work granules;

when all of the plurality of work granules have been completed, the coordinator process executes the step of merging the first area and the second area into the preexisting data container.

17. A computer-readable medium comprising sequences of instructions for inserting data into a partitioned data container, the sequences of instructions comprising sequences of instructions for performing the steps of:

causing a first process to write a first subset of the data into a first partition of the partitioned data container;

wherein the first partition comprises a region of allocated space that includes a used portion and an unused portion;

wherein a first data value is maintained to indicate a boundary between the used portion and the unused portion;

wherein the first process writes the first subset of data into the unused portion;

causing a second process to write a second subset of the data into a second partition of the partitioned data container in parallel with the first process writing the first subset of data into the first partition;

wherein the second partition comprises a region of allocated space that includes a used portion and an unused portion;

wherein a second data value is maintained to indicate a boundary between the used portion and the unused portion;

wherein the second process writes the second subset of data into the unused portion; and merging the first subset and the second subset into the data container by updating the first data value and the second data value to include the first subset and second subset in the used portions.

18. The computer-readable medium of claim 17 wherein the first process writes the first subset without generating an undo log record and the second process writes the second subset without generating an undo log record.

19. The method of claim 1 wherein the preexisting data container is a container within a database system; and the steps causing the first write, causing the second write and merging are all performed within the database system.

20. The method of claim 1 wherein:

the step of causing the first write process to write the first subset of the set of data to the first area includes the step of causing the first write process to write the first subset of the set of data to a first segment that is external to the data container;

the step of causing the second write process to write the second subset of the set of data to the second area includes the step of causing the second write process to write the second subset of the set of data to a second segment that is external to the data container in parallel with the first write process writing the first subset to the first segment; and the step of merging the first area and the second area includes the step of merging the first segment and the second segment into the preexisting data container.

21. The computer-readable medium of claim 10 wherein:

the preexisting data container is a container within a database system; and the steps causing the first write, causing the second write and merging are all performed within the database system.

22. The computer-readable medium of claim 10 wherein:

the step of causing the first write process to write the first subset of the set of data to the first area includes the step of causing the first write process to write the first subset of the set of data to a first segment that is external to the data container;

the step of causing the second write process to write the second subset of the set of data to the second area includes the step of causing the second write process to write the second subset of the set of data to a second segment that is external to the data container in parallel with the first write process writing the first subset to the first segment; and the step of merging the first area and the second area includes the step of merging the first segment and the second segment into the preexisting data container.

23. A computer system for processing a statement that requires insertion of data into a preexisting data container, the system comprising:

a memory;

one or more processors coupled to the memory; and a set of instructions contained in the memory, the set of instructions including instructions which when executed by the one or more processors, cause the one or more processors to perform the steps of:

causing a first write process to write a first subset of the set of data to a first area that is external to the data container;

causing a second write process to write a second subset of the set of data to a second area that is external to the data container in parallel with the first write process writing the first subset to the first area; and merging the first area and the second area into the preexisting data container.

24. The system of claim 23 wherein:

the first area and the second area are marked as temporary areas while the first write process and the second write process are writing to the first area and the second area;

the first write process writes the first subset to the first area without generating an undo log record; and the second write process writes the second subset to the first area without generating an undo log record.

25. The system of claim 23 wherein:

the first write process writes the first subset directly to the first area without using a shared buffer cache; and the second write process writes the second subset directly to the second area without using the shared buffer cache.

26. The system of claim 23 wherein:

the system is a database system;

the data container is contained within the database system; and the set of instructions are executed by the database system such that the steps of causing the first write, causing the second write and merging are all performed within the database system.

27. The system of claim 23 wherein:

the step of causing the first write process to write the first subset of the set of data to the first area includes the step of causing the first write process to write the first subset of the set of data to a first segment that is external to the data container;

the step of causing the second write process to write the second subset of the set of data to the second area includes the step of causing the second write process to write the second subset of the set of data to a second segment that is external to the data container in parallel with the first write process writing the first subset to the first segment; and the step of merging the first area and the second area includes the step of merging the first segment and the second segment into the preexisting data container.

* * * * *